United States Patent [19]

Johnson et al.

[11] 4,269,234
[45] May 26, 1981

[54] HIGH STRENGTH PIPE

[75] Inventors: Doyle F. Johnson, Lawrenceville; Nelson F. Goetz, Atlanta, both of Ga.

[73] Assignee: Tri State Culvert Corporation, Clearwater, Fla.

[21] Appl. No.: 40,116

[22] Filed: May 18, 1979

[51] Int. Cl.³ .............................................. F16L 11/14
[52] U.S. Cl. .................................... 138/121; 138/138; 138/143; 138/145; 138/174; 138/DIG. 2
[58] Field of Search ............... 138/121, 122, 138, 140, 138/143, 145, 172, 173, 174, DIG. 2

[56] References Cited

U.S. PATENT DOCUMENTS

| 3,479,621 | 11/1869 | Martin | 138/143 |
| 3,550,639 | 12/1970 | Okuda | 138/121 |

FOREIGN PATENT DOCUMENTS 522825  10/1963  Belgium .................................. 138/122

Primary Examiner—James E. Bryant, III
Attorney, Agent, or Firm—Jones, Thomas & Askew

[57] ABSTRACT

A high strength pipe comprising a corrugated metallic tube defining a series of annular troughs therewithin and a resinous material lining the interior surface to fill the troughs and create a smooth and corrosion resistant surface.

6 Claims, 2 Drawing Figures

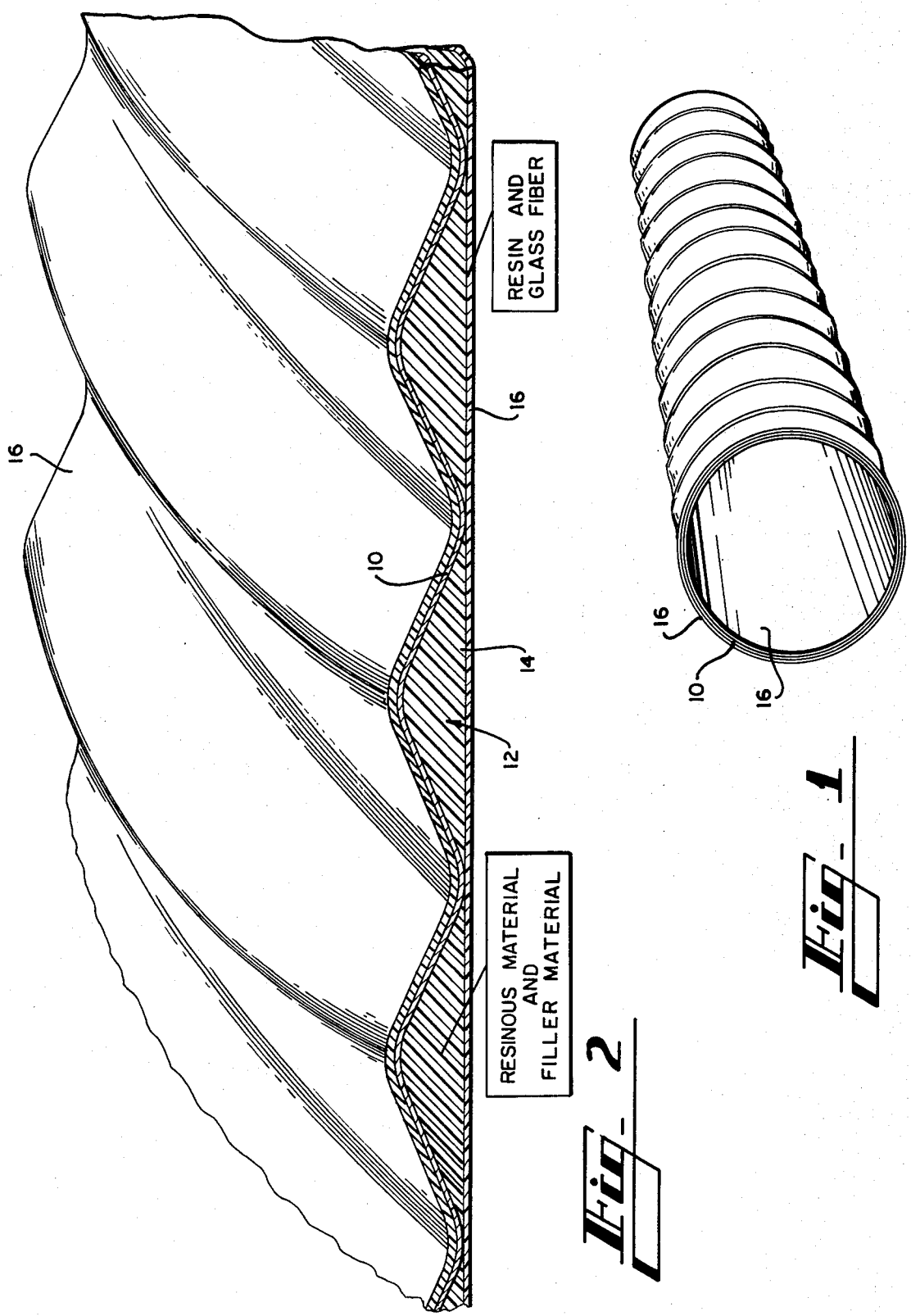

HIGH STRENGTH PIPE

BACKGROUND OF THE INVENTION

This invention relates generally to pipes, and particular to high strength metallic pipes of the corrugated type.

Heretofore, corrugated metal pipes have found widespread commercial acceptance because of their high degree of structural strength. Where however a pipe is to serve as a conduit for corrosive liquids with a relatively laminar flow therethrough an exposed metal corrugated configuration has not proven effective. Efforts have recently been made to render corrugated pipes suitable for conveyance of corrosive liquids with laminar flow by packing their inner, corrugated surfaces with asphalt to form a smooth, generally cylindrical bore. These efforts however have generally not been successful since asphalt is structurally weak and tends to separate from the corrugated pipe particularly where the pipe is heated or where the asphalt has been allowed to dry thoroughly.

Accordingly, it is a general object of the present invention to provide a high strength, corrosion resistant and laminar flow-through pipe.

More specifically, it is an object of the invention to provide a strong corrugated pipe having a relatively smooth bore through which liquid may pass with laminar flow.

Another object of the invention is to provide a high strength, laminar flow-through pipe of the type described having improved corrosion resistance and structural integrity.

Yet another object of the invention is to provide a high strength laminar flow-through pipe of the type described having an interior bore-defining surface that is acid, corrusion and heat resistant.

SUMMARY OF THE INVENTION

In a preferred form of the invention a high strength, laminar flow-through pipe is provided comprising a corrugated tube of metal which defines a series of annular troughs therewithin. A resinous material is coated onto the interior of the pipe to fill the interior troughs. A fiberglass liner is then coated onto the resinous filler material to line the interior of the pipe and create a substantially cylindrical surface defining the pipe bore.

BRIEF DESCRIPTION OF THE DRAWING

FIG. 1 is a perspective view of a pipe embodying principles of the invention in a preferred form.

FIG. 2 is a cross-sectional view of a segment of the pipe illustrated in FIG. 1.

DESCRIPTION OF THE PREFERRED EMBODIMENT

Referring now in more detail to the drawing, there is shown a standard corrugated metal pipe 10 containing a lining of resinous material 12 according to the principles of the invention. The pipe comprises a conventional corrugated steel tube 10 having a series of alternate annular ridges and troughs on both the exterior and interior thereof. The resinous material 12 is comprised of two distinct layers. An inner layer 14 is coated directly to the inner metal surface of the pipe and is applied in such a fashion that the troughs between interior ridges are substantially filled to create a substantially flat and cylindrical surface. The inner layer of resinous material comprises a suitable resin, for example bisphenol-A polyester resin, and a suitable filler such as silica, pecan meal or other conventional fillers either alone or in combination with one another. A top layer 16 of resinous material is then coated onto the top of the inner layer of material and the top of the ridges of the metal pipe to create a uniform resinous surface for the interior of the pipe. The top layer is comprised of a suitable resin, such as bisphenol-A polyester and glass fibers such as standard commercial grade non-continuous glass fibers. A standard coupling agent is normally included in this mixture to facilitate bonding between the resin and the glass fibers. A suitable blend of resin and glass fibers is 30–35% glass fiber and 65–70% resin.

Upon completion, the interior of the corrugated pipe is smooth and free from corrugations. The resinous surface provided by the interior coating aids in laminar flow of liquids therethrough and enhances the corrosion resistance of the pipe. An excellent bond is formed between the two layers of resinous material and, because of the corrugations in the metal pipe, the inner layer of resinous material is immobilized and will not slip within the pipe.

It should be understood that the first described embodiment merely illustrates principles of the invention in one preferred form. Many modifications, additions and deletions may be made thereto without departure from the spirit and scope of the invention as set forth in the following claims.

We claim:

1. A high strength pipe comprising a corrugated tube of metal defining a series of annular troughs therewithin, a resinous material forming an inner layer on the inner pipe surface and substantially filling said annular troughs, and a top layer of resinous material containing glass fiber and lining the interior of said pipe to form a substantially cylindrical inner surface.

2. A high strength pipe in accordance with claim 1 wherein said inner layer of resinous material comprises a mixture of a polyester resin and filler material.

3. A high strength pipe in accordance with claim 2 wherein said polyester resin comprises bisphenol polyester resin.

4. A high strength pipe in accordance with claim 2 wherein said filler material is selected from the group consisting of silica and pecan meal.

5. A high strength pipe in accordance with claim 1 wherein said top layer of resinous material comprises a mixture of polyester resin and glass fiber.

6. A high strength pipe in accordance with claim 5 wherein said top layer comprises approximately 30 to 35% glass fiber and 70 to 65% resin.

* * * * *